(12) United States Patent
Masaki et al.

(10) Patent No.: US 6,653,745 B1
(45) Date of Patent: Nov. 25, 2003

(54) POWER SOURCE APPARATUS FOR A CAR

(75) Inventors: Ryoso Masaki, Hitachi (JP); Masahiko Amano, Hitachiota (JP); Mutsuhiro Mori, Mito (JP); Hideki Miyazaki, Hitachi (JP); Kazuo Tahara, Hitachi (JP); Keiichi Mashino, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/668,168

(22) Filed: Sep. 25, 2000

(30) Foreign Application Priority Data

Sep. 24, 1999 (JP) ............................................ 11-269846

(51) Int. Cl.$^7$ ................................................. B60L 1/00
(52) U.S. Cl. ...................... 307/10.1; 307/126; 307/140; 318/139
(58) Field of Search ................................. 307/10.1, 10.7, 307/66, 81, 120, 139–140; 318/139

(56) References Cited

U.S. PATENT DOCUMENTS

| | | | | |
|---|---|---|---|---|
| 5,341,075 A | * | 8/1994 | Cocconi | 307/66 |
| 5,619,107 A | * | 4/1997 | Shinohara et al. | 307/10.7 |
| 5,717,310 A | * | 2/1998 | Sakai et al. | 307/10.1 |
| 5,796,175 A | * | 8/1998 | Itoh et al. | 307/10.1 |
| 5,998,884 A | * | 12/1999 | Kitamine et al. | 180/65.8 |
| 6,060,851 A | * | 5/2000 | Imai et al. | 318/437 |
| 6,097,107 A | * | 8/2000 | Ikeda | 307/10.7 |
| 6,333,568 B1 | * | 12/2001 | Bitsche et al. | 307/10.1 |
| 6,476,571 B1 | * | 11/2002 | Sasaki | 318/139 |

FOREIGN PATENT DOCUMENTS

| | | | |
|---|---|---|---|
| JP | 06-270767 | * | 5/1996 |
| JP | 11-136801 | * | 5/1999 |
| JP | 2000-257539 | * | 9/2000 |

OTHER PUBLICATIONS

"Considerations Implementing A Dual Voltage Power Network"—Stefan Mueller, Xaver Pfab, BMW AG, Munich, Germany pp. 61–69 (1998), No Month.

* cited by examiner

Primary Examiner—Brian Sircus
Assistant Examiner—Sharon A. Polk
(74) Attorney, Agent, or Firm—Crowell & Moring LLP

(57) ABSTRACT

A power source apparatus includes a first switching element for controlling the power feed in the direction from a high-voltage battery to an inverter, and a second switching element for the power feed in the direction from the inverter to a low-voltage battery, and the voltage at the direct current side is controlled to be higher than that of the high-voltage battery when a battery controller for controlling the first and second switching elements breaks down.

6 Claims, 5 Drawing Sheets

POWER SOURCE APPARATUS FOR A CAR

BACKGROUND OF THE INVENTION

The present invention relates to a power source apparatus for a car, and especially to a power source apparatus with different voltage levels.

The electrical power consumed in a car has increased from year to year. Accordingly, a method, corresponding with high-power-consuming components mounted in a car by situating a high-voltage battery besides a conventional low-voltage battery, is known.

For example, a method of charging a 14V low-voltage battery and a 42V high-voltage battery in a car is disclosed in a paper titled "Consideration Implementing a Dual Voltage Power Network" by S. Muller and X. Pfab, Proc. of Convergence 98, Detroit, U. S. A., 1998. In this method, two kinds of batteries are charged by converting alternating current (AC) power generated by an alternator to direct current (DC) power, and feeding the DC power while switching two switches. According to this method, since it is possible to charge two batteries without using a DC/DC converter, a charging system can be constructed at a low price.

However, if an anomaly occurs in a battery controller for controlling the two switches, and the two switches cannot be turned on, it becomes impossible to charge the two batteries, with the power generated by a motor in a car. Consequently, when the charged power is consumed by the running of the car, the car will stop.

SUMMARY OF THE INVENTION

An object of the present invention is to provide a power source apparatus which makes it possible to run a vehicle without stopping the vehicle even if a battery controller breaks down.

Also, another object of the present invention is to provide a power source apparatus which makes it possible to start an engine of a vehicle even if the engine is in a stop state when the battery controller breaks down.

To achieve the above objectives, the present invention provides a power source apparatus for a car, comprising: a high-voltage battery and a low-voltage battery; an inverter for performing power-conversion of the voltage from one of the two batteries; a first switching element for controlling power-feed in the direction from the high-voltage battery to the inverter; and a second switching element for controlling power-feed in the direction from the inverter to the low-voltage battery.

In the above power source apparatus, six switching elements which compose the inverter are integrated with the first and second switching elements.

Further, in the above power source apparatus, one terminal of the first switching element and one terminal of the second switching element are connected to positive pole terminals of the high-voltage and low-voltage batteries, respectively; and the other terminal of the first switching element and the other terminal of the second switching element are connected to a positive pole terminal at the direct current side of the inverter.

Furthermore, in the above power source apparatus, wherein the first switching element is composed of a first field effect transistor (FET) and a diode connected to the first FET in the reverse direction; the second switching element is composed of a second FET and a diode connected to the second FET in the forward direction; and when current flows from a source to a drain of one of the first and second switching elements, the current is controlled so as to flow in one of the first switching element and the second switching element by turning on a gate of this switching element.

Also, in the above power source apparatus, the output voltage of the inverter is controlled corresponding with states of the first and second switching elements.

Moreover, in the above power source apparatus, the inverter is connected to a motor; and if at least one of the first and second switching elements becomes uncontrollable, the output voltage of the inverter is controlled by determining in which of a driving state and a generating state the motor is operated.

That is, in the above power source apparatus, even if a battery controller for controlling the first and second switching elements breaks down, by controlling the output voltage at the direct current side of the inverter so as to be higher than that of the high-voltage battery, the high-voltage battery can be charged with power generated by the motor via the diode connected to the first FET of the first switching element, in the reverse direction. Thus, by feeding power to the high-power electrical loads necessary for the running of the car from the high-voltage battery, it is possible to drive the car until the fuel for the engine is completely consumed.

Further, if the engine is stopped, only by controlling the inverter, it is possible to convert direct-current power fed from the low-voltage battery via the diode connected to the second switching element. Accordingly, the motor can be driven, which in turn can start the engine. Thus, even if the first and second switching elements are uncontrollable, the car can be started.

DETAILED DESCRIPTION OF THE EMBODIMENTS

Figure 1:
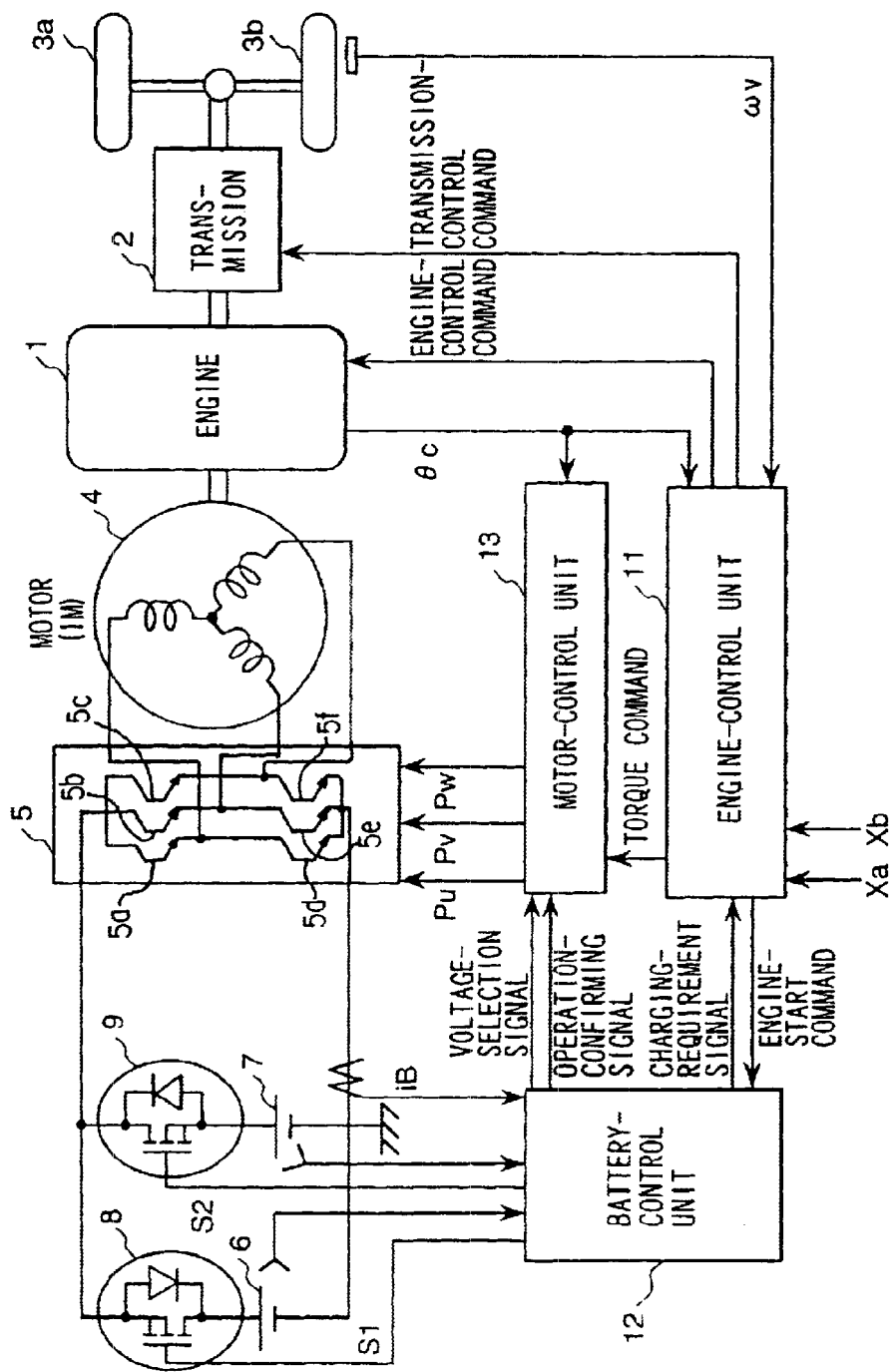
FIG. 1 is a schematic block diagram showing the composition of a power source apparatus of an embodiment, in which an induction motor is used, according to the present invention.

FIG. 1 schematically shows the composition of a car in which the rotational speed of an engine 1 is changed by a transmission, and electrical power consumed in the car is generated by a motor 4 driven by the energy of the engine 1. When the motor 4 is rotated by the engine 1, three-phase AC voltage is generated. This three-phase voltage is converted to DC voltage by an inverter 5. A high-voltage battery 6 is mainly used for high-power-consuming components, and is used to store electrical power necessary for components used in the running of the car. For example, an electrically-driven air conditioner, a motor-driven power steering, an electromagnetically-driven valve of the engine, etc., consume the power stored in the high-voltage power 6. And, electrical loads connected to the low-voltage battery 7 are lighting lamps, a radio, and so on.

A high-voltage FET (Field Effect Transistor) 8 of a first switching element is connected between the positive poles of the high-voltage battery 6 and the inverter 5, and a low-voltage FET 9 of a second switching element is connected between the positive poles of the low-voltage battery 7 and the inverter 5. The inverter 5 contains six transistor switching elements 5a–5f. Further, the source and the drain of the high-voltage FET 8 are connected to the positive pole of the high-voltage battery 6 and the positive pole of the inverter 5. Thus, current can be streamed from the inverter 5 to the high-voltage battery 6 via a reversely-connected first diode who included in the high-voltage FET 8. Furthermore, the source and the drain of the low-voltage FET 9 are connected to the positive pole of the inverter 5 and the positive pole of the low-voltage battery 7. Thus, current can be streamed from the low-voltage battery 7 to the inverter 5 via a forward connected second diode included in the low-voltage FET 9.

In the following, respective control methods of controlling an engine controller 11, a battery controller 12, and a motor controller, which are used for controlling the above electrical power system, will be explained.

The engine controller 11 takes in an acceleration signal Xa, a braking signal Xb, a crank angle θc, a car speed ωv, and a charging-requirement signal, and sends an engine control command and a transmission-control command to the engine 1 and the transmission 2, respectively. Moreover, the engine controller 11 sends a start command and a torque command to the battery controller 12 and the motor controller 13, respectively. The battery controller 12 takes in the respective charging states of the high-voltage and low-voltage batteries 6 and 7, and controls the batteries based on the operational state of the engine 1. That is, if a start command is input while the engine 1 is stopped, the battery controller 12 outputs gate signals S1 and S2 for performing switching-operations of the high-voltage and low-voltage batteries 6 and 7, respectively, in accordance with the algorithm for starting the engine 1. Further, the battery controller 12 sends a voltage-selection signal for indicating which battery is selected. If a start command is not input, the battery controller 12 sends a charging-requirement signal to the engine controller 11, corresponding with the charging states of the batteries 6 and 7, and performs a process for selecting the battery to be charged. Furthermore, the battery controller 11 controls the gate signals S1 and S2, and the voltage-selection signals, so as to optimize the charge amount based on the battery current iB. Moreover, the battery controller 12 sends an operation-confirming signal for indicating that the battery controller 12 functions, to the motor controller 13.

The motor controller 13 takes in the torque command, the voltage-selection signal, the operation-confirming signal, and the crank angle θc, and sends PWM signals Pu, Pv, and Pw, to the inverter 5 so as to make the torque of the motor agree with the torque command value, considering that the DC voltage of the inverter 5 is equal to the voltage of each battery. By performing the above processes, the motor 4 driven by the engine 1 generates AC voltage, the high-voltage battery 6 or the low-voltage battery 7 is selectively charged via the inverter 5. Also, the engine 1 can be started by either the high-voltage battery 6 or the low-voltage battery 7.

Figure 2:
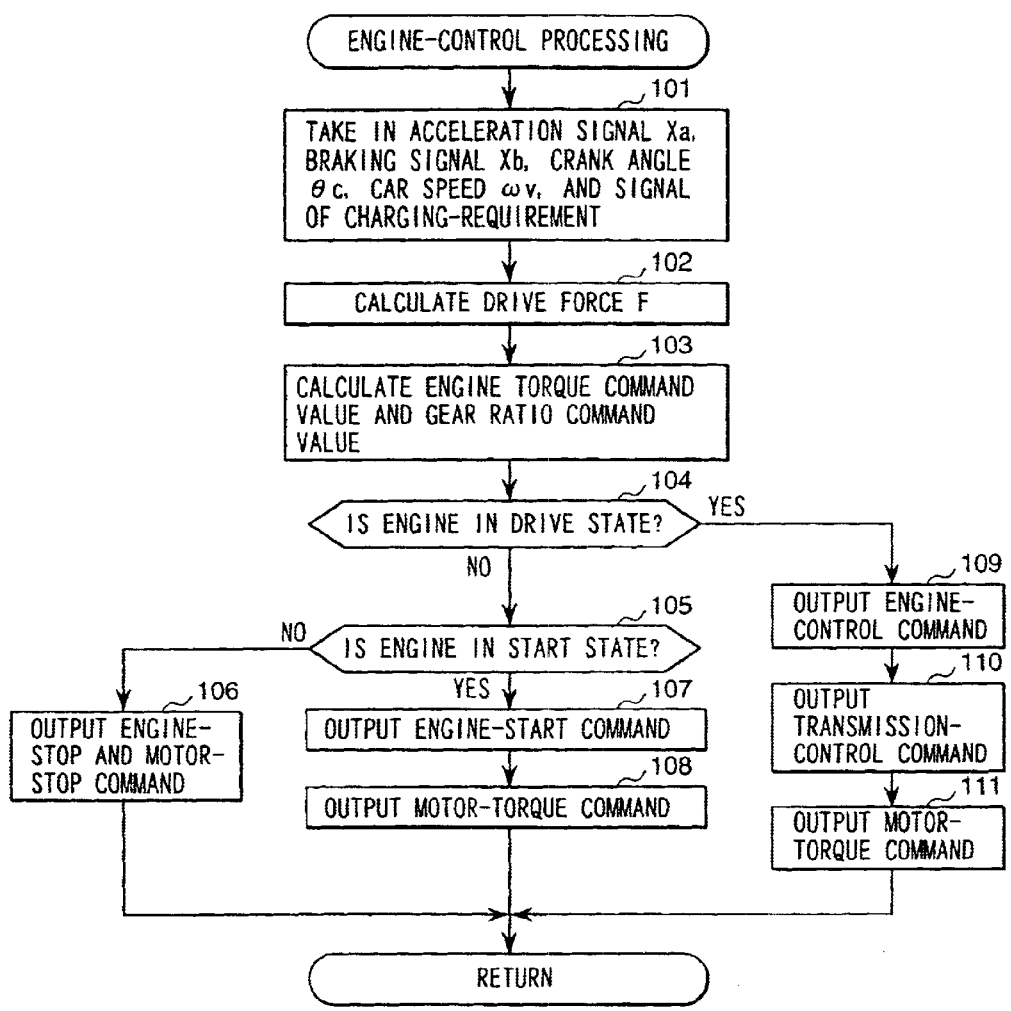
FIG. 2 is a flow chart of an engine-control method executed by an engine controller 11.

Next, the operations of the three controllers 11, 12, and 13 are explained below in more detailed. FIG. 2 shows a flow chart of the algorithm executed by the engine controller 11. In step 101, the acceleration signal Xa, the braking signal Xb, the crank angle θc, the car speed ωv, and the charging-requirement signal are taken in, and in step 102, the drive force F of the car is obtained using the above signals. Further, in step 103, the speed-change ratio command is obtained so as to gain the drive force F. The engine torque command is determined, based on the sum of the torque for generating the drive force F and the torque for ensuring electrical power used to charge the batteries. Furthermore, if it is determined, in step 104, that the engine 1 is in a drive state, the processes in steps 109–111 are executed. Otherwise, the determination process instep 105 is executed. When the engine 1 is in the drive state, the engine-control command is determined, based on the engine torque command and the crank angle θc, and is sent to the engine 1. In step 110, the transmission-control command is determined using the speed-change ratio command, the engine speed obtained by the use of the crank angle θc, the car speed ωv, and so on, and is sent to the transmission 2. And, in step 111, the motor torque command for generating the necessary electrical power is determined, based on the charging-requirement signal and the engine speed, and is sent to the motor controller 13.

On the other hand, if the engine 1 is not in the drive state, it is determined, in step 105, whether or not the engine 1 should be started. That is, if the engine 1 is not in the drive state despite of the presence of the engine torque command or the charging-requirement command, the processes for starting the car, in steps of 107 and 108, are executed. If it is not necessary to start the car, in step 106, the car is turned to the stop state, or while the car continues to be stopped, the motor-stop command for setting the torque command for the motor 4 to be 0 is sent to the motor controller 13. In step 107, the engine-start command is sent to the battery controller 12 so as to start the engine 1, using one of the two batteries. In the next step 108, the torque command necessary for starting the engine 1 is sent to the motor controller 13. In accordance with the above processes executed by the engine controller 11, the operations of the engine 11, which are necessary for the battery-charge and the engine-star, are ensured.

Figure 3:
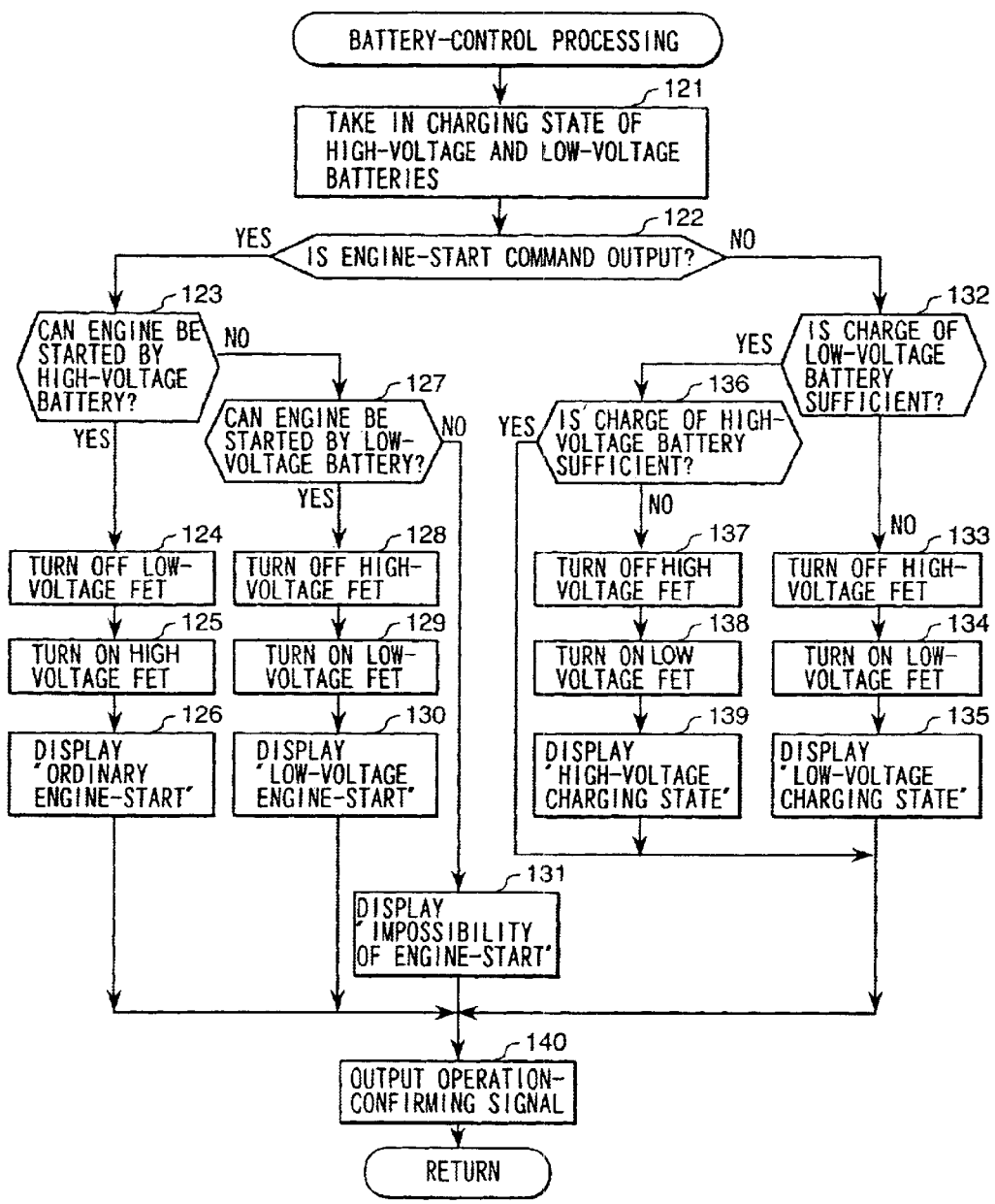
FIG. 3 is a flow chart of a battery-control method executed by a battery controller 12.

The battery controller 12 executes the processes shown in FIG. 3. That is, first, in step 121, the voltage and the current iB of each battery are detected in order to acquire the charging states of the high-voltage and low-voltage batteries 6 and 7. In step 122, the presence of the engine-start command is determined, and if there is an engine-start command, the processes following step 123 are executed. Otherwise, the processes following step 132 are executed. That is, if the engine-start command exists, first, it is determined whether or not the engine 1 can be started, based on the charge amount of the high-voltage battery 6. If starting the engine 1 is possible, the low-voltage FET 9 is turned off in step 124, and the high-voltage FET 8 is turned on instep 125. Further, it is displayed that the engine 1 is ordinarily started, and the voltage-selection signal indicating that the selected battery is the high-voltage battery 6 is sent to the motor controller 12. If the engine 1 is started with the high-voltage battery 6, since the battery current is small, the consumption of electrical power can be reduced. Therefore, the engine 1 is usually started with the high-voltage battery 6. Here, since it is possible to charge the high-voltage battery 6 via the high-voltage diode reversely-connected to the high-voltage FET 8, without performing the ON-control of the high-voltage FET 8 in step 125, this ON-control of the high-voltage FET 8 is not always necessary. However, since it becomes possible, by the ON-control of the FET, to stream current in the FET with internal resistance lower than that of the diode in which the forward voltage drop is large, the power loss in the switching element can be reduced. Thus, by performing the above control with the FET, a highly-efficient charging of the battery can be realized. After the step 126, the process instep 140 is executed. Instep 140, the operation-confirming signal indicating that the battery controller is functioning is sent to the motor controller 13.

If it is determined, in step 123, that the engine 1 cannot be started due to the shortage of charge amount in the high-voltage battery 6, it is determined, in step 127, whether or not the engine 1 can be started with the low-voltage battery 7. If that is possible, the processes in steps 128–130, for starting the engine 1 with a low-voltage start method, are executed. Further, if it is also impossible to start the engine 1 with the low-voltage battery 7, in step 131, it is displayed that starting the engine 1 is impossible. And, the process in step 140 is executed.

In steps 128–130, it is displayed to a driver that the engine 1 is started by the low-voltage start method in which the high-voltage FET 8 is turned off, and the low-voltage FET 9 is turned on, and the voltage-selection signal to which "low voltage" is set is sent to the motor controller 13. Since the driver can recognize that the starting of the engine 1 is different from the ordinary engine-start, if such a situation continues for a long time, it urges the driver to perform an inspection and maintenance of the car. And, the process in step 140 is executed.

On the other hand, if it is determined that there is no engine-start command, the charging state of the low-voltage battery 7 is examined. If its charge amount is insufficient, the high-voltage FET 8 is turned off in step 133, and the low-voltage FET 9 is turned on in step 134. Next, the charging state of the low-voltage battery 7 is displayed to the driver, and the voltage-selection signal indicating that the low voltage is selected for starting the engine 1, that is, the low-voltage battery 7 is connected to the inverter 5, is sent to the motor controller 13. Further, the charging-requirement signal is sent to the engine controller 11, depending on the states of the voltage and the current iB of each battery. By turning on the low-voltage FET 9, the charging current does not flow in the low-voltage diode, but in the low-voltage FET 9, which in turn reduces the power loss in the switching element.

In step 132, if it is determined that the charge amount in the low-voltage battery 7 is sufficient, the charging state of the high-voltage battery 6 is examined in step 136. If the charge amount in the high-voltage battery 6 is sufficient, the process jumps to step 140, otherwise, the high-voltage FET 8 is turned off in step 137. In step 138, by turning on the low-voltage FET 9, charging of the high-voltage battery 6 becomes possible. Further, in step 139, it is displayed that the high-voltage battery 6 is being charged, and the motor controller 13 is informed, with the voltage-selection signal, that the high-voltage battery 6 is connected to the inverter 5. Furthermore, the charging-requirement signal is sent to the engine controller 11 based on the voltage and current iB of the high-voltage battery 6. By the above processing, the charging of the high-voltage and low-voltage batteries 6 and 7 can be controlled. As the algorithm for charging the batteries, it is effective to first determine the charging state of the high-voltage battery 6. Moreover, it is also possible to determine which battery be given the priority of charging, based on the difference between the charge amounts of both batteries.

In the processing executed by the battery controller 12, the process in step 140 is always performed, and it is one feature of the present invention that a charging method and an engine-start method are selected according to the operation state of the battery controller 12, confirmed by the process in step 140.

Figure 4:
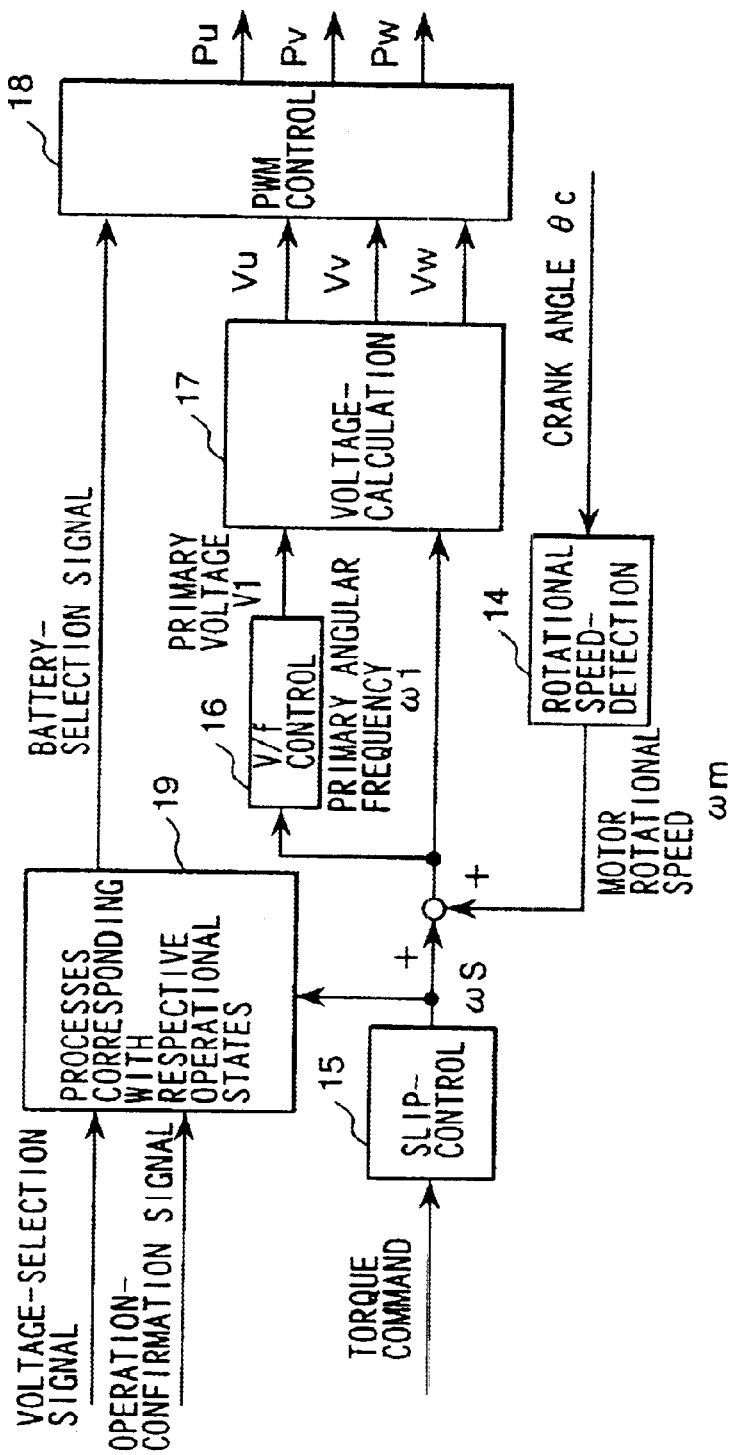
FIG. 4 is a schematic block diagram of the functional composition for implementing a control method executed by a motor controller 13.

The feature of the present invention is explained below along with the operation of the motor controller 13, with reference to FIG. 4. FIG. 4 shows the control method executed by the motor controller 13. That is, FIG. 4 is a schematic block diagram showing the functional composition for controlling the motor 4 for which an induction motor is used. First, a slip-control unit 15 determines the slip angular frequency ωs of the induction motor 4 based on the motor torque command sent from the engine controller 11. A speed-detection unit 14 calculates the motor speed ωm based on the crank angle θc of the engine 1. Since the motor 4 is directly connected to the engine 1, the motor speed ωm can be detected by using the crank angle θc, and it is necessary to provide a rotational speed sensor exclusive to the motor 4. Next, the primary angular frequency ω1 is calculated using the motor speed and the slip angular frequency. Further, the primary voltage V1 is obtained, based on the primary angular frequency ω1, so that the level of current flowing in the motor 4 is almost constant. In the control generally called a V/f control, the value of V1/ω1 is controlled to be constant, or to take a value of a predetermined function, and a V/f control unit 16 performs this control. A voltage-calculation unit 17 calculates the voltage command values Vu, Vv, and Vw for the respective phases based on the primary voltage V1 and the primary angular frequency ω1. Further, a PWM control unit 18 converts the voltage of the motor 4 to PWM signals Pu, Pv, and Pw so that the respective voltage values of the motor 4 agrees with the voltage command values Vu, Vv, and Vw, and the obtained PWM signals Pu, Pv, and Pw are input to the inverter 5. Here, since the DC voltage in the inverter 5 is determined by the voltage of the battery connected to the inverter 5, the PWM control unit 18 calculates the PWM signals Pu, Pv, and Pw, using a battery-selection signal obtained by a unit 19 for performing the processes corresponding with the respective operational states.

The unit 19 for performing the processes corresponding with the respective operational states, outputs the voltage-selection signal intact, as the battery-selection signal, if no anomaly is found in the operation-confirming signal for the battery controller 12. That is, if the voltage-selection signal indicates the high-voltage-selection, the battery-selection signal is also set to "high voltage". On the other hand, if an anomaly is found in the operation-confirming signal for the battery controller 12, The following processes are performed. First, it is determined which of the battery-charging and the engine-start is required, based on the slip angular frequency ωs calculated by the slip-control unit 15. If the sign of the slip angular frequency ωs is positive, it is determined that the motor 4 is in the driving state, that is, the engine 1 is in the start state. Consequently, the battery-selection signal is set to "low voltage", and is sent to the PWM control unit 18. Conversely, if the sign of the slip angular frequency ωs is negative, it is determined that the motor 4 is in the power-generating state, and the battery-selection signal which is set to "low voltage", is sent to the PWM control unit 18. According to the above control, the engine-start using the low-voltage battery 7, and the charging of the high-voltage battery 6, can be carried out via the low-voltage FET 9, and the diode reversely connected to the high-voltage FET 8, respectively, even if the battery controller 12 breaks down. That is, although the conventional switching circuits cannot generate power or charge batteries if the battery controller breaks down, the switching circuit according to the present invention can generate power or charge batteries in such a situation, which in turn can improve the reliability of a power source system for a vehicle, in which a plurality of batteries are controlled. Especially, since the high-voltage battery 6 is used for operating components situated in a vehicle, which needs large-power, the power source apparatus of the above embodiments, which is capable of charging the high-voltage battery 6 even if the battery controller 12 breaks down, is favorable for such components in a vehicle. Thus, if a vehicle is designed so that a fuel injection apparatus, electrical power is fed to an electromagnetically-driven valve for controlling the amount of intake air, etc., from the high-voltage battery 6, it creates an advantage that a vehicle continues to run until the fuel in the engine is completely consumed.

Figure 5:
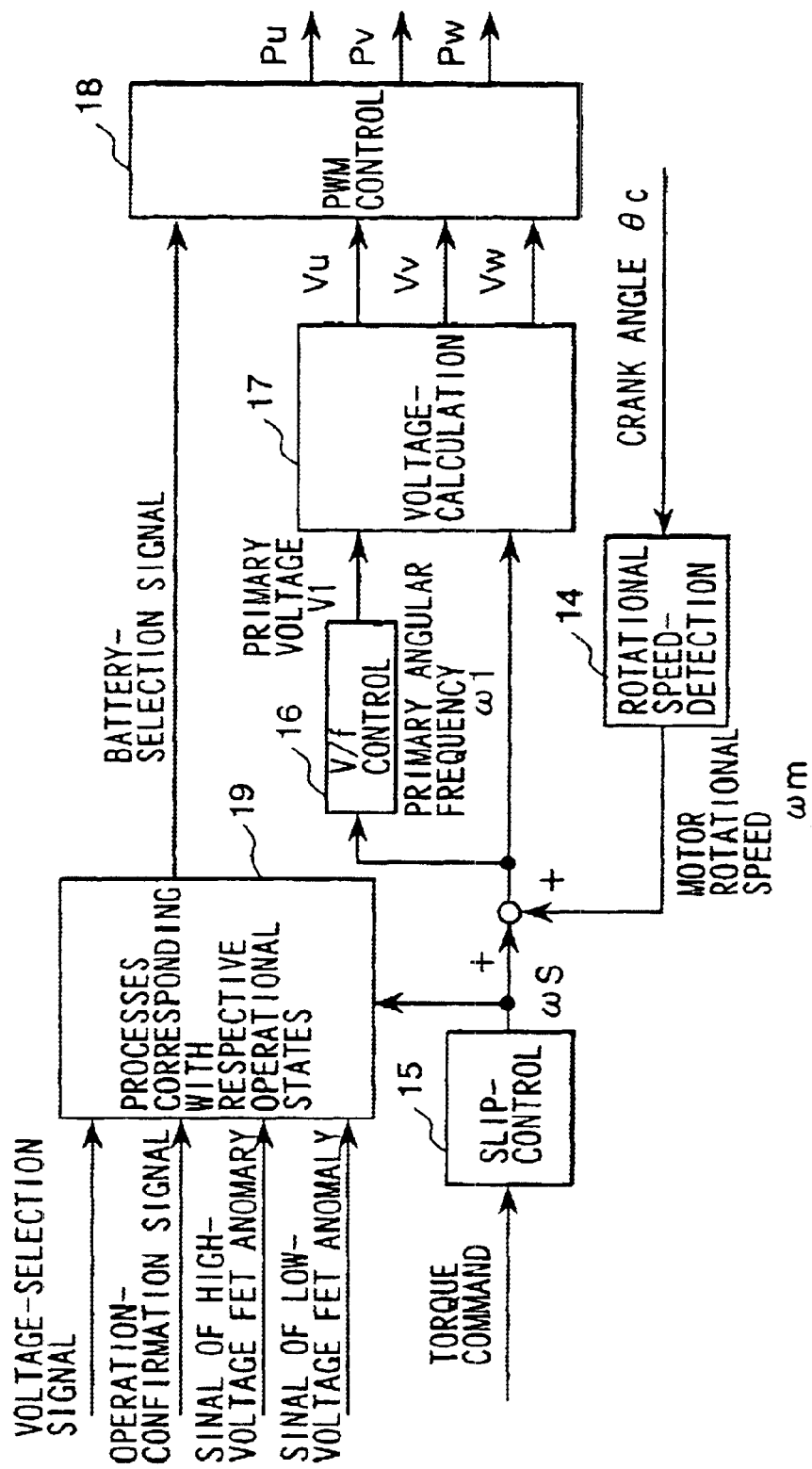
FIG. 5 is a schematic block diagram of the functional composition for implementing a control method executed by a motor controller 13 in another embodiment, in which a car can be driven even if a high-voltage FET and/or a low-voltage FET cannot be controlled.

FIG. 5 shows a schematic block diagram showing the functional composition for controlling the motor 4, in another embodiment, in which the process executed by its motor controller is different from those in the embodiment shown in FIG. 4. If an anomaly in the high-voltage FET 8 or the low-voltage FET 9 is detected, a signal of high-voltage or low-voltage FET anomaly is taken in to the motor controller 12. This signal is input to the unit 19 for performing the processes corresponding with the respective operational states, and the following process is performed.

If the signal of high-voltage FET anomaly indicates that the high-voltage FET 8 is in an anomalous state, and the other signal does not indicate an anomaly occurrence, only the gate signal S2 is controlled so that the start of the engine 2 is always conducted with the low-voltage battery 7. On the other hand, if the signal of low-voltage FET anomaly indicates that the low-voltage FET 9 is in an anomalous state, and the other signal does not indicate an anomaly occurrence, charging of the low-voltage battery 7 is stopped. That is, it is determined only to start or stop the charging of the high-voltage battery 6. Moreover, if both signals of high-voltage FET anomaly and low-voltage FET anomaly indicate anomaly occurrences, the car can be driven by executing the same processes as those executed when the operation-confirming signal for the battery controller 12.

Although an induction motor is used as the motor 4 in the above embodiments of the present invention, the power source apparatus of the present invention can also be composed using a synchronous motor.

In accordance with the above embodiments, since electrical power to drive a car even if a battery controller to perform an ON/Off control of switching elements for switching the operation mode of each of a plurality of batteries between the charging and discharging modes, can be ensured, it has become possible to start an engine every time it is needed, and this can improve the reliability of running of the car.

What is claimed is:

1. A power source apparatus for a car, comprising:
   a high-voltage battery and a low-voltage battery;
   an inverter for performing power-conversion of the direct current voltage from one of said two batteries into an alternating current voltage;
   a first switching element connected to said high voltage battery in series and arranged in a direct current side terminal of said inverter; and
   a second switching element connected to said low voltage battery in series and arranged in a direct current side terminal of said inverter,
   said first switching element being constructed with a first power semiconductor controlling power supply in one direction from said high voltage battery to said inverter, and a diode connected to said first power semiconductor in reverse direction, and said second switching element being constructed with a second power semiconductor controlling power supply in one direction from said inverter to said low voltage battery and a diode connected to said second power semiconductor in reverse direction.

2. A power source apparatus according to claim 1, wherein said inverter is composed of six switching elements and said first and second switching elements wherein said six switching elements, said first switching element as said second switching element are integrated.

3. A power source apparatus according to claim 1, wherein the output voltage of said inverter is controlled corresponding with states of said first and second switching elements.

4. A power source apparatus according to claim 1, wherein when at least one of said first and second switching elements becomes uncontrollable, the output voltage of the said inverter is controlled by six switching elements forming said inverter based on termination of operating condition of motor either in driving motor or regeneration mode.

5. A power source apparatus for a car, comprising:
   a high-voltage battery and a low-voltage battery;
   an inverter for performing power-conversion of the voltage from one of said two batteries;
   a first switching element for controlling power-feed in the direction from said high-voltage battery to said inverter; and
   a second switching element for controlling power-feed in the direction from said inverter to said low-voltage battery, wherein one terminal of said first switching element and one terminal of said second switching element are connected to positive pole terminals of said high-voltage and low-voltage batteries, respectively; and the other terminal of said first switching element and the other terminal of said second switching element are connected to a positive pole terminal at the direct current side of said inverter.

6. A power source apparatus for a car, comprising:
   a high-voltage battery and a low-voltage battery;
   an inverter for performing power-conversion of the voltage from one of said two batteries;
   a first switching element for controlling power-feed in the direction from said high-voltage battery to said inverter; and
   a second switching element for controlling power-feed in the direction from said inverter to said low-voltage battery, wherein said first switching element is composed of a first field effect transistor (FET) and a diode connected to said first FET in the reverse direction; said second switching element is composed of a second FET and a diode connected to said second FET in the forward direction; and when current flows from a source to a drain of one of said first and second switching elements, the current is controlled so as to flow in said one of said first and second switching elements by turning on a gate of this switching element.

* * * * *